Patented Dec. 25, 1934

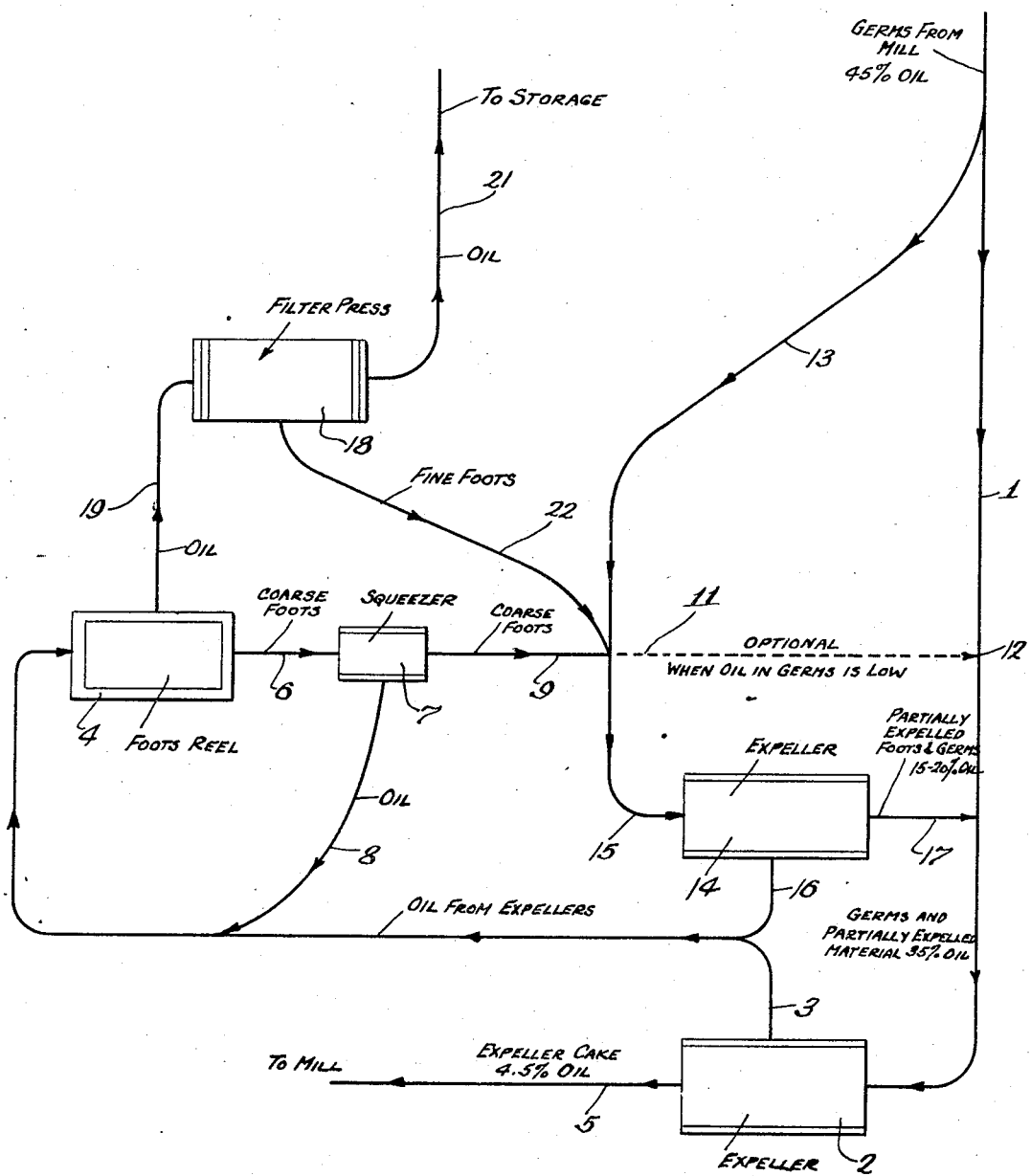

1,985,426

UNITED STATES PATENT OFFICE 1,985,426

REMOVAL OF FOOTS FROM CRUDE OIL

Elbert Calvin Ragsdale, Decatur, Ill., assignor to A. E. Staley Manufacturing Company, Decatur, Ill., a corporation of Delaware Application April 16, 1932, Serial No. 605,678

5 Claims. (Cl. 87—6)

This invention relates in general to the extraction of oil from oil bearing materials, and while it will be hereinafter described in connection with extraction of oil from corn germs, soy beans, and the like, it will be readily apparent that it has other and more general valuable application.

In extracting oil from oil bearing material, such for example as the germs from corn kernels, soy beans, etc., the material is ground and supplied to expellers or presses in which by pressure the oil is extracted from the cake and forced through the expeller for subsequent removal and purification. These expellers, as is well known in the industry, operate continuously delivering the oil at one point and the cake or relatively dry material at another. Some sediment, generally called foots, is carried by the extracted oil as it leaves the expeller and this sediment or foots must be later filtered out to provide the finished oil of desired purity.

This invention contemplates filtering of the extracted oil and the return of the foots back into the oil bearing material before delivery to the expeller. As a result of this procedure numerous benefits and economies are effected. Among these may be mentioned that in the past the filtering of the oil has required much larger equipment to separate the foots from the oil and the continued operation of an oil extracting apparatus or plant has necessitated frequent shut downs for cleaning the filters and for repair of the expellers to the end that the expellers maintain a percentage of foots in the extracted oil sufficiently low to permit filtering within the capacity of the available oil filtering equipment.

In accordance with the present invention the continuous return of the extracted foots into the expeller with the oil bearing material causes the foots to finally leave the apparatus in the oil cake and it is therefore relatively unimportant whether or not the percentage of foots carried by the oil to the filters be large or small since rough and fine filtering permits the return of the foots back into the oil bearing materials. A certain amount of oil is taken back with the foots and this oil is recovered as it again passes through the expeller.

Another important object of the invention is the provision of a process for extracting oil from oil bearing material, which will permit of the maintenance of a predetermined percentage or optimum of oil in the oil bearing materials. That is to say, that extraction of oil is best and most economically carried on when the oil bearing materials have a predetermined or substantially predetermined percentage of oil to be extracted. By the present invention it is possible to return the recovered foots to the oil bearing materials with an oil content which, when merged with the oil content of the oil bearing materials, will provide the desired optimum or substantially the desired optimum of oil.

A further and highly important object of the invention is the provision of the process of extracting oils from oil bearing materials which may be readily employed and controlled to produce a cake of lower oil content than has heretofore been easily accomplished.

Numerous other objects of the invention will be apparent as it is better understood from the following description, which, when taken in connection with the drawing, discloses a preferred embodiment thereof.

The single figure on the drawing is a flow sheet of an oil extracting apparatus embodying the present invention.

Since this invention does not particularly concern itself with structural details of oil extracting equipment, and since these are generally known to those engaged in the industry, no detail drawing or description is believed necessary of the several pieces of apparatus employed.

The oil bearing material is first ground and suitably conveyed, as indicated at 1, to an expeller 2 of usual or preferred construction, in which the oil is separated from the cake. This expeller operates continuously and the extracted oil passes out or is delivered through a line 3 to a filter 4. The cake or solid matter is delivered by a conveyor or conduit 5 to the feed house or otherwise discharged.

The oil flowing through the line 3 to the foots reel 4 contains a greater or less percentage of foots or sediment, which has passed through between the bars of the expeller.

It may be mentioned that as these expellers continue in service the percentage of foots or sediment passing between these bars increases and unless the oil be treated in accordance with the present process the duty upon the filter press 18 becomes so excessive as to require either that the foots reel be continually cleaned or that the expeller be removed from service, taken down and reassembled with the parts in new and more accurate adjustment.

The foots reel 4 also operates continuously and the oil passing through its relatively fine mesh leaves the coarser foots within the reel to tail over its delivery end into the foots discharge pipe or line 6. A substantial percentage of oil is permitted to pass over the tail of the foots reel and proceed with the foots to a squeezer, generally indicated at 7, which is or may be a small expeller of the type employed to separate the oil from the cake as indicated by reference character 2. The oil extracted by the squeezer is delivered from a line 8 into the line 3 for return again through the foots reel 4. The coarse foots after extraction of the desired percentage or amount of oil in the squeezer 7 is delivered by a conveyor or line 9 back for incorporation in the oil bearing material being fed to the expeller 2. This delivery may be direct and through a line or conveyor 11 communicating at 12 with the feed line 1 for the oil bearing material.

The delivery into the oil bearing material may be so accomplished as to control the optimum or percentage of oil in the material (expeller oil bearing material and foots combined) to the expeller 2.

A portion of the oil bearing material is preferably passed through a branch line 13 leading from the line 1 into communication with the line 9 and from there into a second expeller 14 as indicated at 15.

From the intersection of the lines 9, 11 and 13 the portion of the oil bearing material thus diverted is mixed with the foots and the two are passed through the expeller 14 which, as will be readily understood, is adapted to lower the oil content of the combined oil bearing material and foots to a desired amount.

The oil extracted by the expeller 14 is or may be delivered into the line 3 by a connecting line, indicated at 16. The combined oil bearing material and foots after passing through the expeller 14 are delivered through a line 17 into the line 1 which directly feeds the expeller 2.

In extracting oil from corn germs it has been found entirely practical in the practice of the process of this invention to permit the coarse foots and the contained oil delivered from the foots reel 4 to consist of 60 to 70 percent of oil and 40 to 30 percent of dry foots matter. This percentage of oil is or may be reduced in the squeezer 7 to from 15 to 20 percent of oil and 85 to 80 percent of solid matter. This control of the oil content is desirable, among other accounts, in order that the oil bearing materials entering into the expeller 2 may have the percentage of oil best calculated to eliminate losses and produce efficient and economical operation. Corn germs normally contain in the general neighborhood of 45 percent of oil and it is believed best that the oil bearing material delivered into the expeller 2 contain merely 35 percent of oil.

From the squeezer the foots with its oil content is delivered into a portion of the oil bearing material moving through lines 13 into the expeller 14, in which the oil content of the two, i. e. a combined mix of this foots and the oil bearing material, is reduced to a percentage which, when it is expelled, upon delivery through the line 17 and mixed with the oil bearing material flowing through the main line 1, will give the percentage of oil content of 35 percent or other desired amount for entrance into the expeller 2.

Extraction of the maximum of oil from the oil bearing material produces a larger percentage of foots because of the pressure employed and extraction of maximum of oil has heretofore been generally considered impractical and uneconomical in commercial operation because of the difficulty and expense of removing the resulting large amount of foots from the oil. Where the present invention is employed the percentage of foots to be removed from the expelled oil is unimportant and the extraction may be readily accomplished to produce a cake having minimum oil content. Also by reason of the accurate control of the oil optimum or content of the oil bearing materials minimum oil content can readily be provided in the cake discharged from the expeller 2 through the line 5 to the mill, as has already been explained.

The oil after passing through the foots reel 4 is preferably given a final filtering through a cloth or paper coated filter press, generally indicated at 18, the oil passing up through a line 19 to this filter press and from the filter press out through a line 21 to storage. The fine foots still remaining in the oil and which is recovered in the final filter press 18, are or may be returned through a line 22 for delivery along with the coarse foots extracted in the coarse foots reel 4.

It will, of course, be understood that the various pieces of apparatus schematically shown on the drawing may be arranged in tandem and in parallel and it may be mentioned that a single preliminary expeller 14 can easily serve a considerable number of expellers which perform the main separation of the oil from the cake. The foots in return enter the expeller 2 along with the other oil bearing material which, of course, is composed of oil and solid residue and in subsequent extractions of oil the returned foots are removed from the apparatus along with the cake.

It is thought that the invention and many of its attendant advantages will be understood from the foregoing description, and it will be apparent that various changes may be made in the steps and their order of accomplishing the process described, without departing from the spirit and scope of the invention or sacrificing all of its material advantages, the process hereinbefore described being merely a preferred embodiment thereof.

I claim:

1. The process of extracting oil from oil bearing material, which comprises delivering oil bearing material to an expeller for separating the oil from the cake, passing the oil through a filter to separate out the foots, delivering the foots with a percentage of oil to a squeezer for reducing the percentage of oil in said foots, and returning said foots to the oil bearing material.

2. The process of extracting oil from oil bearing material, which comprises delivering oil bearing material to an expeller for separating the oil from the cake, passing the oil through a filter to separate out the foots, delivering the foots with a percentage of oil to a squeezer for reducing the percentage of oil in said foots, and returning said foots to the oil bearing material, and returning oil from said squeezer to said filter separating foots from the oil.

3. The process for recovering oil from materials of the type forming foots when oil is expelled therefrom, which comprises subjecting said material to an expelling step to extrude oil having admixed therewith substantial quantities of sediment, filtering said oil to produce an oily quantity of said sediment in the form of foots, mixing said foots with an additional quantity of said material, expelling from said mixture a portion only of the expellable oil therein, adding said mixture to a still further quantity of said material to form an expeller charge, and subjecting said charge to an expelling step to remove substantially all of the expellable oil therefrom.

4. The process for recovering oil from materials of the type forming foots when oil is expelled therefrom, which comprises subjecting said material to a continuous expelling step to continuously extrude substantially all of the expellable oil therefrom, said oil having admixed therewith substantial quantities of sediment, passing said oil through a continuous filter to produce oily quantities of said sediment in the form of foots, mixing said foots with an additional quantity of said material, subjecting said mixture to a continuous expelling step to remove a portion only of the expellable oil therefrom, and adding said mixture to the material to be subjected to said first mentioned expelling step to extrude substantially all of the expellable oil therefrom.

5. The process for recovering oil from materials of the type forming foots when oil is expelled therefrom, which comprises subjecting said material to an expelling step to extrude substantially all of the expellable oil therefrom, said oil having admixed therewith substantial quantities of sediment, filtering said oil to provide an oily quantity of said sediment in the form of foots, mixing said foots with an additional quantity of said material, extruding from said mixture a sufficient quantity of oil to form an expeller charge when mixed with the material being subjected to said expelling step having a more favorable oil content for expelling than said material, and adding said mixture to the material being subjected to said expelling step.

ELBERT CALVIN RAGSDALE.